Jan. 12, 1954
C. R. MOON
2,665,595
HYDRAULIC TRANSMISSION
Filed Dec. 9, 1949
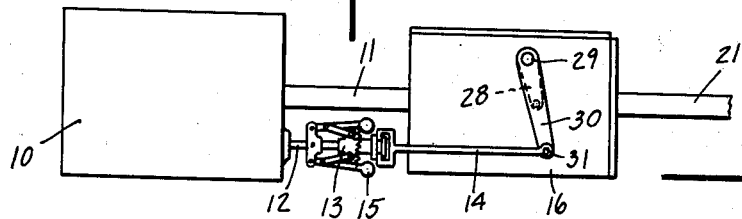
FIG. 1
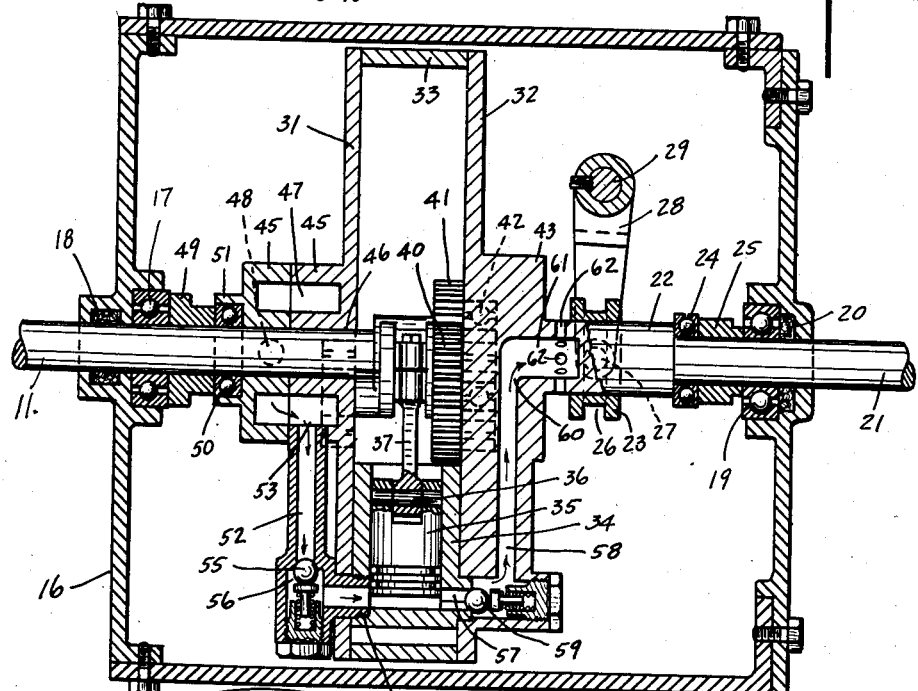
FIG. 2
FIG. 3
INVENTOR.
CHARLES R. MOON.
BY
Lockwood, Galdsmith & Galt.
ATTORNEYS.

Patented Jan. 12, 1954

2,665,595

UNITED STATES PATENT OFFICE 2,665,595

HYDRAULIC TRANSMISSION

Charles R. Moon, Muncie, Ind.

Application December 9, 1949, Serial No. 132,085

1 Claim. (Cl. 74—752)

This invention relates to a hydraulic transmission system that is speed controlled.

The chief object of this invention is to eliminate the conventional spring-plate clutch and gearshift structure of engine driven vehicles and the like, and to utilize the hydraulic transmission hereof in combination with a control automatically responsive to engine speed.

The chief feature of this invention resides in the combination whereby the aforesaid objective is accomplished, such combination including an engine speed responsive control imposed upon an engine driven hydraulic device in turn driving a load, the control relationship being such that within the critical speed limit the engine can be accelerated or decelerated at will for vehicle speed control, but for varying power applications to the driven shaft, the transmission is speed controlled.

Another feature resides in the multiple, parallel connected, cylinders and pistons whereby the liquid is cycled in a plurality of power transmitting streams.

Other objects and features of the invention will be set forth more fully hereinafter.

The full nature of the invention will be understood from the accompanying drawings and the following description and claim:

In the drawings Fig. 1 is a diagrammatic side elevation of a power unit with the invention included therein.

Fig. 2 is a longitudinal sectional view of the hydraulic device, parts being omitted for clearness.

Fig. 3 is an end elevation of the rotatable cylinders, pistons and connecting gears, the connecting conduits being omitted.

In Fig. 1 of the drawings 10 indicates an internal combustion engine having a drive shaft 11 projecting therefrom. It is suitably controlled in the usual manner by means not shown and such as an accelerator, etc. A shaft 12 from the engine drives the conventional centrifugal unit 13 having shaft or rod 14 longitudinally movable in response to movement of weights, such as 15, in accordance with engine speed. The detailed construction of this unit may be any as desired or required.

Shaft 11 extends into and terminates in liquid reservoir 16 which is stationary. It is antifrictionally supported at 17 and sealed as at 18. Extending into the reservoir 16 and similarly antifrictionally supported at 19 and sealed at 20 is the driven shaft 21 which terminates within said reservoir.

Slidable longitudinally of and if desired rotatable upon the portion 22 of said shaft 21 is the control sleeve or collar 23. Thrust bearing 24 is disposed between the sleeve 25 about shaft 21 and the end of portion 24. Groove 26 in said collar takes yoke arms 27 of yoke 28 carried by shaft 29 disposed transversely of the aligned shafts 11 and 21 and offset therefrom. Shaft 29 exteriorly of reservoir 16 mounts arm 30 suitably connected at 31 to rod 14 as shown.

Disposed within the reservoir is the hollow flywheel like structure or drum having forward plate 31, rearward plate 32 and peripheral wall 33. Carried within the same are a plurality of cylinders 34, herein three being shown, and equidistantly spaced apart. Reciprocable in each is a piston 35.

Each piston includes wristpin 36 on which is mounted one end of connecting rod 37 which has rotational association with crank portion 38 of a stub shaft 39 mounting gear 40. The opposite ends of shafts 39 are rotatably supported in plates 31 and 32. These gears mesh with sun gear 41 carried by shaft 11 near the rear end thereof, that end being rotatably supported at bearing 42 nested in enlargement 43 of plate 32. Thus all gears are rotated by shaft 11 and the engine drives the several pistons which serve as pumps.

The relative timing may be such that all pistons have identical instantaneous stroke positions, or the timing may be such that when one piston is at one end of its cylinder, another is at the opposite end of its cylinder and a third may be disposed midway between the ends of its cylinder. Herein since all gears are identical there will be one reciprocation of each piston for each rotation of shaft 11. However, by changing the sizes of gears 39—41 a different ratio may be obtained so that each piston for each revolution of shaft 11 may have more or less than one complete reciprocation.

Reference will now be had more particularly to Fig. 2. Shaft 11 is rotatable in two piece chambered extension 45—45 of plate 31. It also extends through said plate at 46. The chamber 47 has an inlet 48 providing free communication with the reservoir. This extension is antifrictionally associated with the sleeve 49 on shaft 11 as by race 50 and sleeve 51.

There are as many intake conduits 52 as there are cylinder-piston constructions. Each has free communication at 53 with intake manifold 47. The other end of conduit 52 has suitable connection as at 54 to a cylinder 34. Adjacent thereto is a downstream check valve in the form of a ball 55 trapped in chamber 56 and normally seated against reverse flow but subject to opening when suction is applied to passage 54.

The cylinder 34 has discharge passage 57 communicating with discharge channel 58 and interposed therebetween is ball check 59 normally constrained to closed position and positively seated upon the piston suction stroke and pressure opened upon the piston pressure stroke. These check valves are differentially and alternately operable, that is opened and are normally contrained to closed position.

Herein, for convenience, passage 58 is shown formed in a radial extension of enlargement 43 of plate 32. The several passages 58 communicate at 60 with the discharge chamber 61 also formed in the enlargement 43. Lateral discharge ports 62 are provided in the enlargement 22 of said shaft 21 and as illustrated sleeve collar 23 is slidable thereon. The total area of ports 62 is in excess of the total area of intake port 48 or a plurality thereof.

In operation reservoir liquid level must be above the two shafts 11 and 21 and preferably is below the level of shaft 29. Whenever the timing is such that suction differs, and suction for each piston occurs when that piston is traversing the lower quadrant in the reservoir, it may be possible to omit the intake manifold and conduits 52. However, this simplification is not preferred because then certain portions of the intake manifold will not be constantly submerged as in the present disclosure.

Further operation is as follows. As engine speed increases and the weights move outwardly the shaft 29 is correspondingly moved clockwise. This moves control valve or collar 23 toward the plates and to a greater or lesser degree restricts discharge from exhaust ports 62.

When collar 23 blocks no part thereof, the pistons, as reciprocated incident to being driven by shaft 11, merely freely cycle the oil. Shaft 21 then is idle. Now when engine speed progressively increases, collar 23 progressively restricts discharge ports 62 so that the greater the restriction the greater will be the speed of shaft 21. When the discharge ports are closed the two shafts 11 and 21 are locked together and rotate at whatever speed the shaft 11 is then rotating. Hence the aforesaid functions as a hydraulic clutch and the same is automatically controlled and is speed controlled in accordance with engine operation. Thus this invention replaces the conventional gearshift and plate clutch units interposed between the engine drive shaft and the vehicle driving shaft of a self propelled vehicle.

While the invention has been described in great detail in the foregoing this is to be considered in no sense one of limitation but by way of example only, the scope of the invention being that recited by the appended claim.

The invention claimed is:

In a power transmission for inclusion between a load shaft and a variable speed prime mover hvaing a drive shaft, a combination of a speed responsive unit continuously operable by the prime mover and at a speed proportional to the speed thereof, a casing forming a liquid reservoir, a driven drum rotatably mounted in said casing and connected with said load shaft, a plurality of cylinder members mounted within said drum and angularly disposed relative to the axis of said drum with the heads thereof extending toward the periphery of said drum, a piston member in each cylinder, gear means connected with said drive shaft, gears rotatably mounted within said drum in mesh with said gear means and connected to said piston members for causing relative reciprocation of said pistons within said cylinders, an intake manifold disposed on and coaxially of said drive shaft and having a fluid passage for receiving fluid from said reservoir, check controlled intakes fixed to said drum and connecting said intake manifold with said cylinder members, a discharge manifold disposed on and co-axially of said load shaft and including ports through said load shaft opening into said reservoir, check controlled discharge passages connecting said cylinder members with said discharge manifold and a collar slidable on said load shaft connected to said speed responsive unit and common to all of said discharge ports for simultaneously controlling the effective discharges from said ports and responsive to and in accordance with operation of said speed unit.

CHARLES R. MOON.

References Cited in the file of this patent

UNITED STATES PATENTS

| Number | Name | Date |
| --- | --- | --- |
| 912,487 | Ramsey | Feb. 16, 1909 |
| 1,300,225 | Schmitt | Apr. 8, 1919 |
| 1,868,965 | Berryman | July 26, 1932 |
| 2,471,668 | Baker | May 31, 1949 |

FOREIGN PATENTS

| Number | Country | Date |
| --- | --- | --- |
| 590,274 | France | Mar. 13, 1925 |
| 649,375 | France | Aug. 27, 1928 |
| 550,884 | France | Dec. 22, 1922 |
| 7,389 | Great Britain | May 17, 1915 |